United States Patent [19]
Colvard

[11] Patent Number: 5,411,049
[45] Date of Patent: May 2, 1995

[54] VALVE

[75] Inventor: R. Lee Colvard, Spring, Tex.

[73] Assignee: Weatherford U.S., Inc., Houston, Tex.

[21] Appl. No.: 215,095

[22] Filed: Mar. 18, 1994

[51] Int. Cl.6 .............................................. F16K 15/04
[52] U.S. Cl. ..................................... 137/71; 137/515.7
[58] Field of Search ................. 137/69, 71, 515, 515.7

[56] References Cited

U.S. PATENT DOCUMENTS

| | | | |
|---|---|---|---|
| 1,490,848 | 4/1924 | Pettit | 137/519.5 |
| 1,577,740 | 3/1926 | Macomber et al. | 137/519.5 |
| 1,700,603 | 1/1929 | Vreeland et al. | 137/519.5 |
| 1,863,613 | 6/1932 | Burt . | |
| 1,872,855 | 8/1932 | Walker | 166/153 |
| 1,875,414 | 9/1932 | Burt . | |
| 1,882,314 | 10/1932 | Burt | 166/328 |
| 1,906,312 | 5/1933 | Burt | 137/533.11 |
| 2,075,882 | 4/1937 | Brantly | 166/21 |
| 2,104,270 | 1/1938 | Owsley | 166/1 |
| 2,162,261 | 6/1939 | Layne | 166/21 |
| 2,309,839 | 2/1943 | Gardner | 137/519.5 |
| 2,320,670 | 6/1943 | Scaramucci | 166/328 |
| 2,627,314 | 2/1953 | Baker et al. | 166/1 |
| 2,630,179 | 3/1953 | Brown | 166/14 |
| 2,654,435 | 10/1953 | Oliver | 166/4 |
| 2,724,443 | 11/1955 | Baler | 137/515 X |
| 2,756,828 | 7/1956 | Deily | 166/164 |
| 2,802,482 | 8/1957 | Cernhold | 137/515 X |
| 2,884,938 | 5/1959 | Hildebrandt | 137/68 |
| 2,935,131 | 5/1960 | McCune | 156/45 |
| 3,006,415 | 10/1961 | Burns et al. | 156/156 |
| 3,062,296 | 11/1962 | Brown | 166/225 |
| 3,102,595 | 9/1963 | Fisher et al. | 166/156 |
| 3,105,378 | 10/1963 | Darling | 73/40.5 |
| 3,153,451 | 10/1964 | Chancellor et al. | 166/51 |
| 3,159,219 | 12/1964 | Scott | 166/156 |
| 3,332,499 | 7/1967 | Attarris et al. | 166/242 |
| 3,385,370 | 5/1968 | Knox et al. | 137/515 X |
| 3,385,372 | 5/1968 | Knox | 166/225 |
| 3,545,543 | 12/1970 | Kammerer, Jr. et al. | 166/212 |
| 3,581,817 | 6/1971 | Kammerer, Jr. | 166/208 |
| 3,759,281 | 9/1973 | Falcuta | 137/519.5 |
| 3,768,556 | 10/1973 | Baker | 166/154 |
| 3,770,001 | 11/1973 | Davis | 137/523.11 |
| 3,776,250 | 12/1973 | Knox | 137/71 |
| 3,776,258 | 12/1973 | Dockins, Jr. | 137/519.5 |
| 4,067,358 | 1/1978 | Streich | 137/624.13 |
| 4,082,104 | 4/1978 | Keeney | 137/71 |
| 4,413,682 | 11/1983 | Callihan et al. | 166/382 |
| 4,429,746 | 2/1984 | Allard | 166/291 |
| 4,442,894 | 4/1984 | Callihan et al. | 166/328 X |
| 4,487,263 | 12/1984 | Jani | 166/289 |
| 4,488,566 | 12/1984 | Hicks | 137/74 |
| 4,515,218 | 5/1985 | Bissonnette | 166/328 |
| 4,589,495 | 5/1986 | Langer et al. | 166/383 |
| 4,603,710 | 8/1986 | Tiefenthaler | 137/514.7 |
| 4,624,316 | 11/1986 | Baldridge et al. | 166/325 |
| 4,625,762 | 12/1986 | Hassanzadeh et al. | 137/624.27 |

(List continued on next page.)

OTHER PUBLICATIONS

Weatherford, "Cementing Program," 1986.

(List continued on next page.)

Primary Examiner—John C. Fox
Attorney, Agent, or Firm—Guy McClung

[57] ABSTRACT

The present invention, in one embodiment, has a valve body within which is mounted a stem support; a plunger with a stem which is movably mounted for movement in the stem support to move a rounded head of the plunger to sealingly contact a sealing surface within the valve body thereby preventing flow through the valve; a piston recess in the stem which receives and holds a top portion of a piston; the piston (or some part connected thereto or formed integrally thereof) held immobile by one or more holding devices (e.g. bars, plates, pins, rods, etc.) which, in one embodiment extend through the piston and into the stem support or into a piston housing and which are frangible, erodible, degradable or destroyable either by action of a hydrostatic head of fluid on a bottom surface of the piston or by chemical or thermal attack and degradation.

10 Claims, 8 Drawing Sheets

U.S. PATENT DOCUMENTS

| | | | |
|---|---|---|---|
| 4,655,247 | 4/1987 | Westra et al. | 137/519.5 |
| 4,674,569 | 6/1987 | Revils et al. | 166/154 |
| 4,687,019 | 8/1987 | Mayfield | 137/519.5 |
| 4,711,300 | 12/1987 | Wardlaw, III et al. | 166/153 |
| 4,712,619 | 12/1987 | Stepp et al. | 166/327 |
| 4,825,947 | 5/1989 | Mikolajczyk | 166/241 |
| 4,872,510 | 10/1989 | Lehr et al. | 166/327 |
| 4,945,947 | 8/1990 | Westra et al. | 137/519.5 |
| 4,979,562 | 12/1990 | Langer | 166/242 |
| 5,228,518 | 7/1993 | Wilson et al. | 166/369 |
| 5,261,488 | 11/1993 | Gullet et al. | 166/241.7 |

OTHER PUBLICATIONS

Weatherford, "General Services And Products Catalog," 1990–1991.

Weatherford, "AF—SURE—SEAL Technical Bulletin HOU 123-001," 1986.

Weatherford, "Model 820 Float Valves Technical Bulletin HOU—115—001," 1984.

Weatherford, "Model 457 Float Valves Technical Bulletin HOU 114—001," 1984.

Weatherford, "Conventional and Specialized Float Equipment," 1985.

Weatherford, "Cementation Products," 1990.

Stringfellow, "Tests find hammering, fluid cutting, erosion cause float shoe failures," Oil & Gas Journal, 1985.

Colvard, "Used float shoe recovered and tested," Oil & Gas Journal, 1986.

Davis–Lunch, Inc., "In Floating And Cementing Equipment," 1984–85.

Baker Packers, "Bakerline Float Equipment & Cementing Aids," 1989.

Trico Industries, Inc., "1982–1983 Catalog," 1982.

Baker Oil Toold, "Primary Cementing," 1989.

Baker Oil Tools, Inc., "Bakerline Stage And Stab-In Cementing Equipment And Services," 1982.

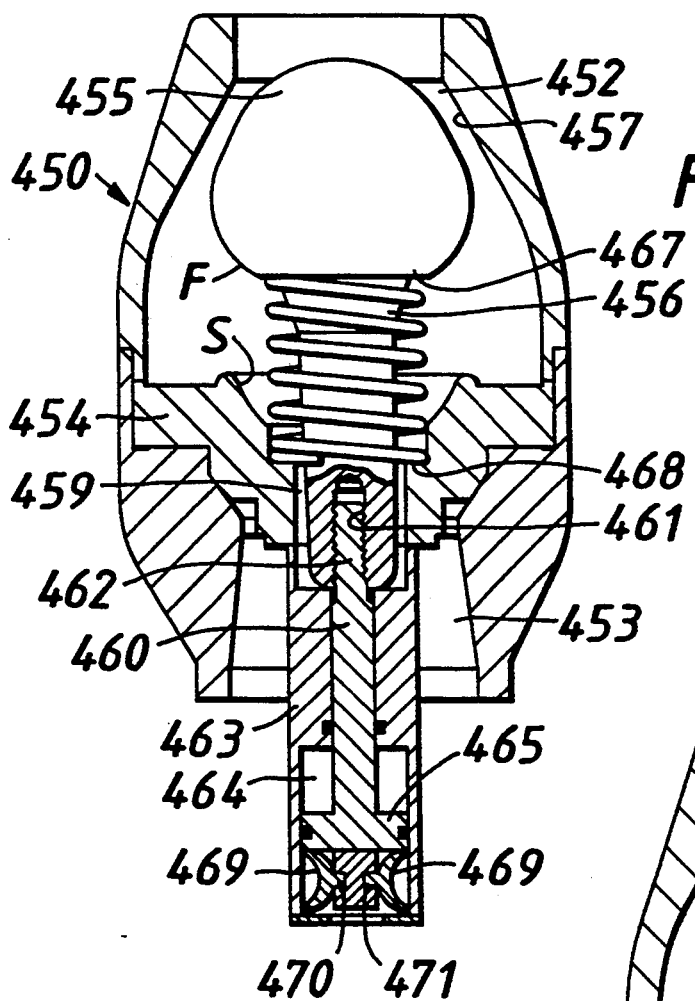
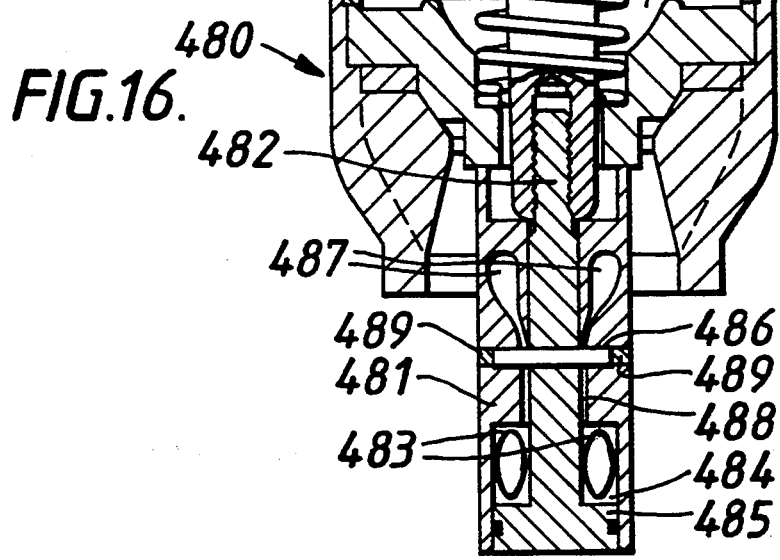
FIG.15.
FIG.16.

VALVE

BACKGROUND OF THE INVENTION

1. Field of the Invention

This invention relates to valves and, in certain embodiments to valves used in wellbore operations. In certain particular aspects this invention relates to equipment for well cementing operations, to float valves and to float equipment, and also to auto-fill flow valves useful in such operations.

2. Description of Related Art

Flow control valves are commonly used in wellbore cementing operations. Typically valves used in equipment employed in such operations are kept in float shoes or float collars of casing as the casing is run into the well to automatically fill the casing from the bottom at a predetermined rate to save rig time expended in manually filling a casing string from the surface as it is being run into the borehole and to reduce the amount of fluid flowing up the annulus between the casing's exterior and the wellbore's interior, thereby reducing surge pressure at a float shoe. Certain prior art floating equipment has some type of sacrificial mechanical part for maintaining the valve in an open position, e.g. shear plates, shear pins, extrusion rings, sliding sleeves, or tension collars. These mechanical items have a calculated strength so that the valve is held open until they move or are broken.

Certain prior art automatic fill float shoes or float collars require a ball or plug to be dropped through the casing string to seal in the valve mechanism of the float shoe or float collar and to seal off the valve mechanism so that pressure applied thereto releases the locked open check valve through shearing or deformation of a sacrificial mechanical part. With such valves there may be a time delay during which the ball or plug has to fall through the fluid in the casing.

Related art includes the valves and cementing equipment shown in the following publications of Weatherford International Incorporated (owner of the assignee of this invention): "Cementing Program," 1986; "General Services And Products Catalog," 1990-91; "Weatherford Cementation Products," 1990; "Stage Tool 620," 1990; "AF-SURE-SEAL Technical Bulletin HOU 123-001," 1986; "Model 820 Float Valves Technical Bulletin HOU 115-001," 1984; "Model 457 Float Valves Technical Bulletin HOU 114- 001," 1984; and "Conventional and Specialized Float Equipment," 1985 (which are incorporated fully herein for all purposes and copies of which are submitted with the application for this patent).

SUMMARY OF THE PRESENT INVENTION

The present invention, in one embodiment, discloses a valve with a valve body within which is mounted a stem support. A plunger has a stem which is movably mounted for movement in the stem support to move a rounded head of the plunger to sealingly contact a sealing surface within the valve body thereby preventing flow through the valve. The valve is initially held open for fluid flow in either direction therethrough. The stem has a piston recess which receives and holds a top portion of a piston. The piston is held immobile by one or more holding devices (e.g. bars, plates, pins, rods, etc.) which extend between the piston and part of the valve body or stem support, or which extend into a piston housing, and which are frangible, erodible, degradable or destroyable either by the force of a hydrostatic head of fluid on the piston or by chemical or thermal attack and degradation. The piston bottom, in certain embodiments, has a piston end which is movably disposed in a fluid chamber. In certain embodiments this fluid chamber alone is used without any holding devices and the force of compressible fluid therein alone prevents the piston from moving until the force of the hydrostatic head of fluid exterior to the fluid chamber is sufficient to compress the fluid in the chamber. The pressure of a hydrostatic head of fluid outside the valve body pushes against the piston, eventually breaking one or more frangible items holding the piston immobile. The freed piston then is moved in the fluid chamber compressing fluid therein, thereby moving the stem and plunger. Once freed, the plunger is moved so its head sealingly contacts an inner sealing surface of the valve body, closing it off and preventing back flow through the valve. Normal flow (e.g. downwardly through the valve) is still possible when the force of such flow overcomes the spring force of a spring which biases the plunger apart from the stem support, facilitating elongation of the piston-piston-housing-plunger combination rendering it of sufficient length so that the plunger head is movable to seal against the valve body. In certain embodiments the fluid chamber holds a compressible gas (air, helium, etc.) and is sized to permit a known limited extent of piston movement to achieve either some desired amount of restriction of flow through the valve or complete closing of the valve to flow. In other embodiments frangible members are used in a cascade fashion (two or more) so that, as one member breaks and the piston moves a certain distance to encounter a subsequent frangible member, flow through the valve is restricted rather than shut off completely as the flow exit orifice is partially closed off by the movement of a nose on the plunger.

In certain embodiments of a valve according to this invention circulation of fluid down the casing through the valve is possible prior to closing of the valve (through a central fluid flow channel through the top of the valve body, through one or more fluid flow channels through the stem support, and through the central flow channel at the bottom of the valve body). Certain devices according to certain embodiments of this invention contain a minimum of aluminum parts and have a majority of parts made from PDC drillable material.

In certain embodiments, holding devices which hold the piston immobile are "broken" or "sheared" by the effects of the action of a chemical fluid (e.g. an acid or base) on the frangible holding device(s), or by the effects of a chemical reaction of two or more chemical fluids, e.g. a holding device made from reactive metal, e.g. aluminum has an acid, e.g. acetic or hydrochloric acid applied to it (e.g. by introduction into the casing to flow to contact the holding device or by the opening of chemical-holding capsules within the device); or by heat of a relatively hot fluid on the holding device. In such embodiments a flow path is provided so that the attacking chemical or hot fluid can contact the holding device(s); e.g. space is provided between the piston's exterior and an interior surface of the channel through the piston housing in which the piston moves. In another embodiment a frangible or rupturable container of attacking fluid (or of two or more fluids that react to produce an attacking fluid, or react exothermically to produce heat or a hot fluid to act upon a heat sensitive holding device and not on the rest of the valve) is disposed in the fluid chamber and is broken by movement of the piston.

In certain embodiments the holding devices which hold the piston are made from low melting point metals, including but not limited to alloys of mercury and/or aluminum, or some other thermally sensitive material which contracts, returns to a previous or an original shape, degrades and breaks when it is subjected to the raised temperatures encountered in a wellbore during wellbore operations. In one method according to this invention wellbore temperatures at one or more locations are calculated and/or measured. Based on this knowledge, holding devices(s) of known temperature sensitivity and of selected size is/are installed in the piston and housing, thus permitting activation (closing of the valve) at a selected point in the wellbore. With a cascade of frangible members, selected amounts of valve restriction and eventual closing are accomplished at zones in the wellbore which are at different temperatures. If shrinking of a holding device rather than breakage or degradation is to be effected to release a piston, then devices of temperature sensitive material may be used, metals which contract or "memory metals," metals which upon heating contract, return to an original shape, and/or become smaller.

In certain embodiments in which the piston holding devices are sheared by chemical action or the effect of temperature on heat sensitive material devices, the compressible fluid chamber described above may be deleted. Embodiments of this invention are effective to retrofit existing float equipment, including, but not limited to, Weatherford Sure Seal 3 float equipment.

In one embodiment the present invention discloses a valve for controlling flow of a fluid in a conduit in which the valve is emplaced, the valve having a body with a first end, a second end, a hollow central fluid flow channel therethrough, and an inner body sealing surface at the first end thereof; a plunger with a stem movably disposed in the body for movement with respect thereto, the stem having a first end and a second end; a sealing head on a first end of the stem of the plunger for restricting fluid flow through a top of the body's hollow central fluid flow channel and for sealingly contacting the inner body sealing surface to restrict or prevent fluid flow through the valve; a piston with a first piston end and a second piston end, the first piston end secured to the stem, a portion of the second piston end movably mounted in a piston housing; a piston housing in or adjacent the body in which the piston is movably mounted, the housing having a first housing end and a second housing end, the first piston end projecting from the first housing end; and at least one holding member (e.g. contacting and/or secured to or through the plunger, piston, stem, or head and valve body) releasably preventing movement until it is broken, contracted or degraded. In one aspect a stem support extends across the body's interior, the stem is movably disposed through the stem support, and the piston housing is mounted below the stem support. One or more fluid flow channels extend through the stem support.

In one embodiment the present invention discloses a valve for controlling flow of a fluid in a conduit in which the valve is emplaced, the valve having a body with a first end, a second end and a hollow central fluid flow channel therethrough; a plunger with a stem movably disposed in the body for movement with respect thereto, the stem having a first end and a second end; a sealing head on a first end of the stem of the plunger for restricting fluid flow through a top of the body's hollow central fluid flow channel and for sealingly contacting the inner body sealing surface to restrict or prevent fluid flow through the valve; a piston with a first piston end and a second piston end, the first piston end secured to and/or in the stem, a portion of the second piston end movably mounted in a piston housing; a piston housing in or adjacent the body in which a portion of the piston is movably mounted; the housing having a first housing end and a second housing end, the first piston end projecting from the first housing end; the second housing end having a compressible fluid chamber therein; the second piston end having a piston plate across and closing off the compressible fluid chamber; the fluid chamber having a fluid therein compressible by forced movement of the piston plate; and the piston plate having an exterior exposed to a hydrostatic head of fluid exterior to the valve such that the hydrostatic head of fluid of sufficient force moves the piston plate to compress the fluid, thereby moving the piston and the sealing head to restrict or prevent flow through the valve. In one aspect a stem support extends across the valve, the stem moves in a channel through the stem support, and the piston housing is disposed below the stem support. At least one fluid flow channel permits fluid flow through the stem support. In one aspect the stem has a piston recess and the first piston end is secured in it.

In one embodiment the present invention discloses a valve for controlling flow of a fluid in a conduit in which the valve is emplaced, the valve having a body with a first end, a second end, a hollow central fluid flow channel therethrough, and an inner body sealing surface at the first end thereof; a plunger with a stem movably disposed in the body for movement with respect thereto, the stem having a first end and a second end; a sealing head on a first end of the stem of the plunger for restricting fluid flow through a top of the body's hollow central fluid flow channel and for sealingly contacting the inner body sealing surface to restrict or prevent fluid flow through the valve; a piston with a first piston end and a second piston end, the first piston end secured to and/or in the stem, a portion of the second piston end movably mounted in a piston housing; a piston housing in or adjacent the body in which the piston is movably mounted, the housing having a first housing end and a second housing end, the first piston end projecting from the first housing end; and the piston having a slot therethrough for receiving and through which extend at least one holding member which releasably contacts the piston and prevents piston movement until the at least one holding member is broken, degraded, or contracted. In one aspect there is a stem support with one or more flow channels therethrough across the body's interior with a stem channel in which the stem is movably disposed. In one aspect the piston housing is beneath the stem support. In one aspect the first piston end is secured in a piston recess of the stem.

It is, therefore, an object of at least certain preferred embodiments of the present invention to provide:

New, useful, unique, efficient, nonobvious valve devices and methods of their use;

Such devices and methods for wellbore operations;

Such methods and devices for wellbore cementing operations;

Such methods and devices sequential stepped restriction of a value orifice and closing thereof; and Such methods and devices for float equipment (e.g. float collars, float shoes, auto-fill valves) used in wellbore cementing operations.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 15 is a side cross-sectional view of a valve according to the present invention.

FIG. 16 is a side cross-sectional view of a valve according to the present invention.

DESCRIPTION OF EMBODIMENTS PREFERRED AT THE TIME OF FILING FOR THIS PATENT

Figure 1:
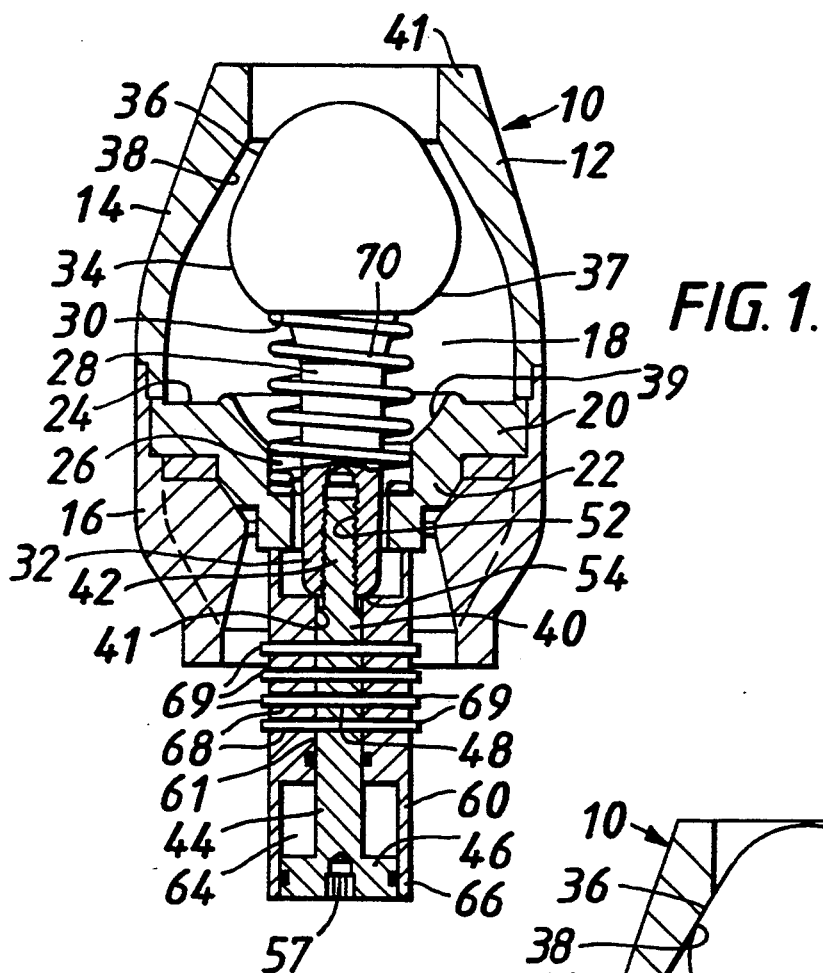
FIG. 1 is a side cross-sectional view of valve according to the present invention.

Referring now to FIG. 1, a valve 10 according to the present invention has a body 12 which includes an upper body 14 secured, e.g. by an epoxy adhesive or mechanical securement apparatus to a lower body 16. A stem support 20 extends across a central fluid flow channel 18 of the body 12. The stem support 20 has a ring 22 and arms 24 between which fluid flows in and out in communication with the central fluid flow channel 18.

A plunger 30 has a stem 28 with a lower end 32 thereof movably mounted in a central channel 26 of the stem support 20. A head or rounded nose 34 of the plunger has an exterior area 36 which is movable to sealingly contact an interior surface 38 of the body 12 to close off a first top end 41 of the body 12 of the valve 10 and prevent fluid flow therethrough; and an exterior area 37 which is movable to contact a lower body surface 39 on the stem support 20 in response to fluid flowing through the top of the valve body 12 downwardly against the nose 34 body 12 of the valve 10. With a conical shaped nose 34 (or other appropriately sized, rounded or configured shape used in conjunction with an appropriately sized and configured interior valve body surface), movement of the plunger 30 can effect partial restriction of the central fluid flow channel 18 to control fluid flow without entirely stopping it.

A piston 40 has a top end 42, a bottom end 44, an end plate 46, and holes 48 therethrough. The top end 42 of the piston 40 is secured in a piston recess 52 of the stem 28, e.g. with epoxy adhesive or by threaded engagement of mating threads on the two parts. A top shoulder 41 of the piston 40 is movable to abut an end 54 of the stem 28 to prevent further piston movement. Complete closing of the valve 10 is prevented by appropriate location of the shoulder 41 in certain embodiments in which valve closing is not desired.

The piston 40 is movably disposed in a central channel 61 of a piston housing 60 which is positioned adjacent to a bottom end of the stem support 20. The top end 42 of the piston projects from a top end 62 of the housing 60. The bottom end 44 of the piston 40 and the plate 46 are disposed for movement in a fluid chamber 64 formed in a bottom end 66 of the housing 60. The chamber 64 is filled with a gas (e.g. air, nitrogen, or helium) or other compressible material. O-rings 63 (in a recess 67 of the housing 60) and 65 (in an O-ring recess 47 of the piston 40) maintain the gas in the chamber 64. A pop valve or rupture member or disc may be installed in the wall of the end 66 of the housing 60 adjacent the chamber 64 to provide an escape path for compressed fluid when it reaches a certain pressure sufficient to open the pop valve or break the rupture member.

Frangible, erodible, degradable and/or destroyable ("frangible" collectively referring to these characteristics) members 69 extend from holes 68 in the housing 60 into the holes 48 in the piston 40. They may be removably or permanently disposed in the holes.

Figure 2:
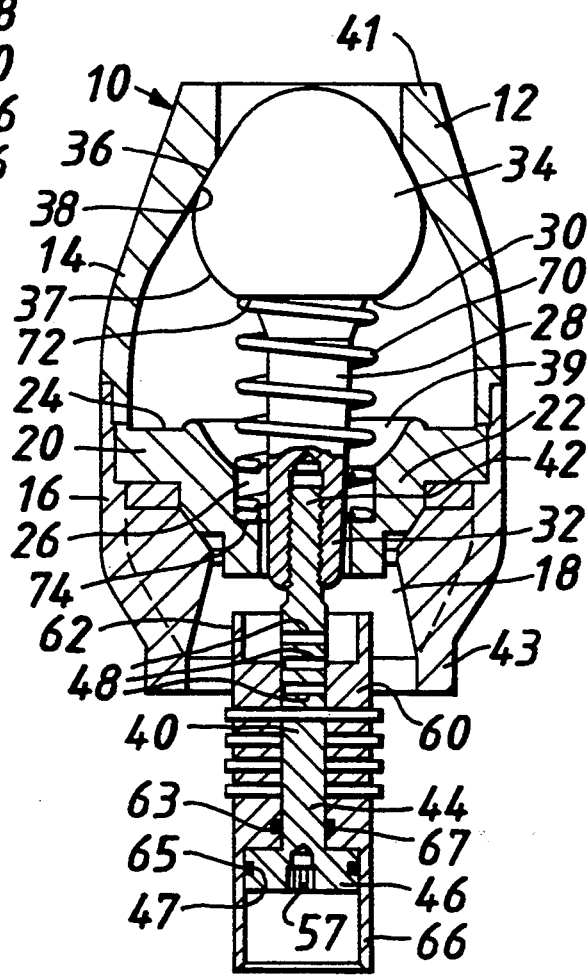
FIG. 2 is a side cross-sectional view of valve according to FIG. 1.
Figure 3:
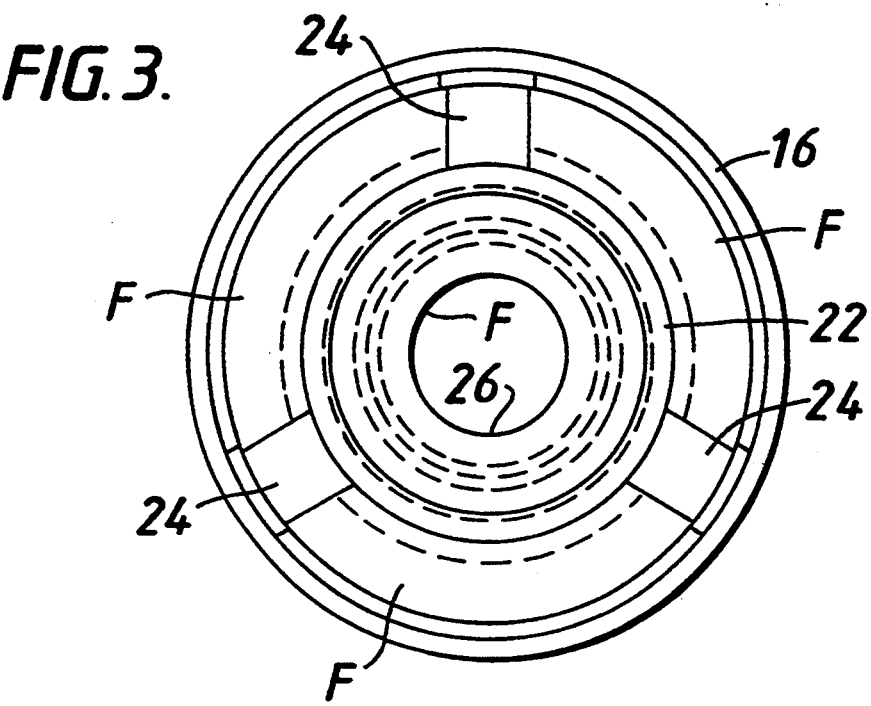
FIG. 3 is a cross-sectional view of a valve body with a stem support therein of the valve of FIG. 1.

A spring 70 is biased against an end 72 of the plunger nose 34 and against an inner shoulder 74 of the stem support 20. Once the frangible members 69 are broken, the spring forces the plunger away from the stem support to the extent permitted by the effective lengthening of the housing-stem-plunger combination resulting from the breaking of the frangible members and from the movement of the housing with respect to the stem. A tool or other member is securable in a female recess 57 in the plate 46. FIG. 3 shows fluid flow channels as fluid flow paths F through the stem support 20. FIGS. 5–8 illustrate parts of the valve 10 as shown in FIGS. 1 and 2.

Figure 4:
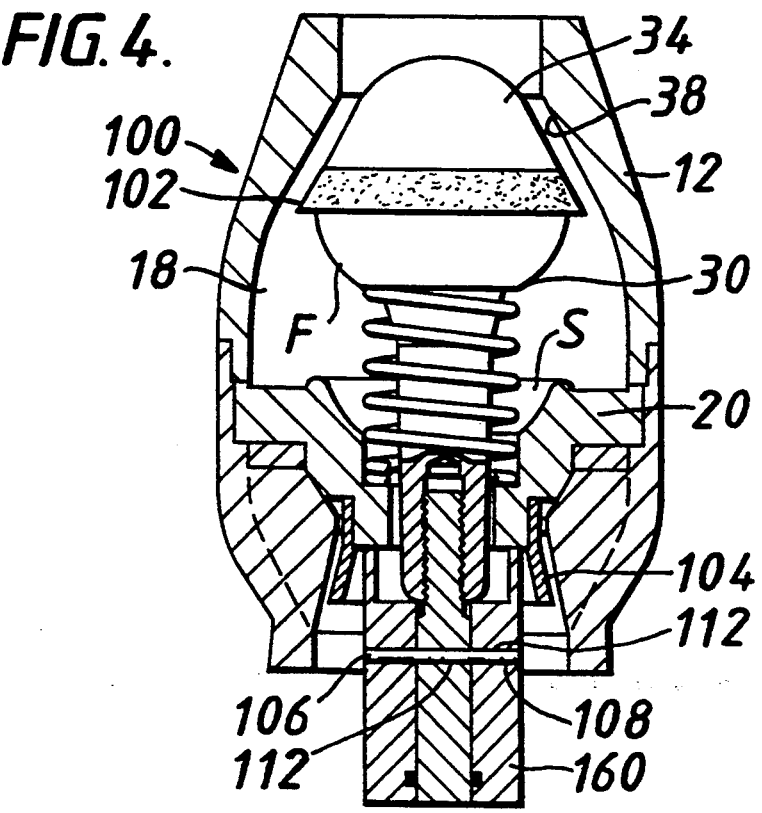
FIG. 4 is a side cross-sectional view of a valve according to the present invention.
Figure 5:
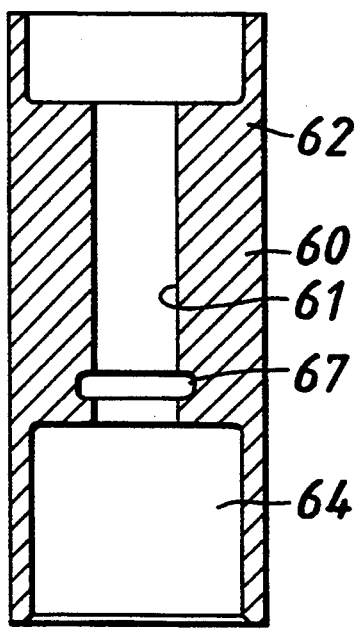
FIG. 5 is a side cross-sectional view of a portion of the valve of FIG. 1.
Figure 6:
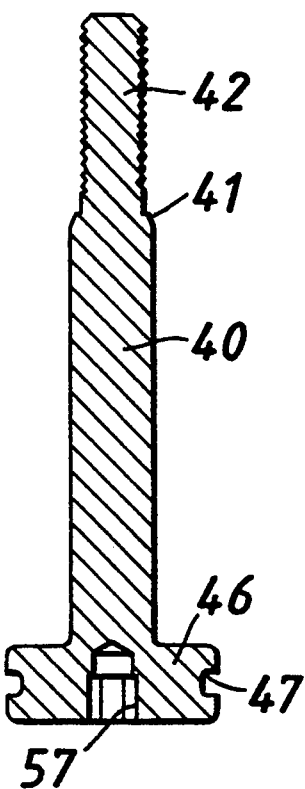
FIG. 6 is a side cross-sectional view of a portion of the valve of FIG. 1.
Figure 7:
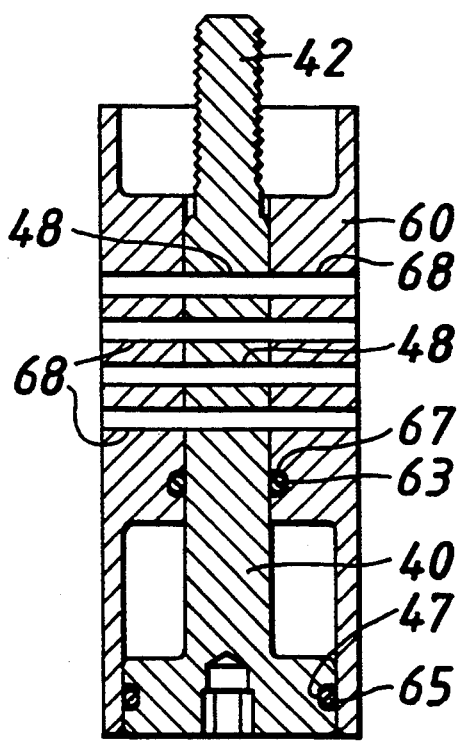
FIG. 7 is a side cross-sectional view of a portion of the valve of FIG. 1.
Figure 8:
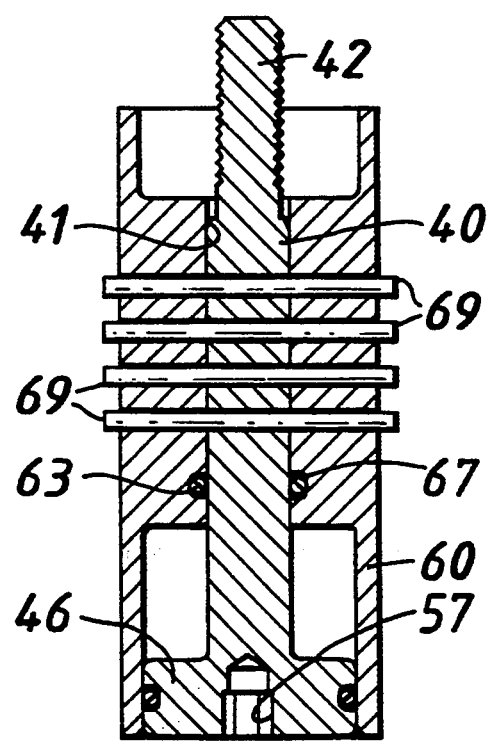
FIG. 8 is a side cross-sectional view of a portion of the valve of FIG. 1.

FIG. 4 illustrates a valve 100 according to the present invention which is like the valve 10 (and identical numerals in FIGS. 1 and 4 indicate identical parts). An elastomeric sealing element 102 is secured to or formed of the nose 34 for sealingly contacting the inner surface of the housing 12. This element 102 may be flexible so that upwardly flowing fluid forces it outwardly and against the surface 38. A flow skirt 104 secured to or formed of the stem support 20 directs fluid back flow. The valve 100 has one (or more as desired) chemically degradable or heat degradable piston holding members 106 that extend through a hole 108 in a piston housing 160 (like the housing 60) and into a hole 112 in a piston 140 (like the piston 40). Upon breaking of the member 106, the plunger 30 is freed to move to seal against the valve body 12. For fluid attack the member(s) may have holes through them or in them into which fluid may enter or the hole or recess in which they are disposed may be oversized to permit fluid flow therein. As in the valve 10 (FIG. 1) sealing contact of a lower nose surface F against a surface S on the stem support is possible.

Frangible member holding device(s) as previously described herein may be disposed between the piston and any part of the valve to hold the piston immobile until the holding device is weakened, destroyed, or broken; e.g., but not limited to, a holding device disposed through a part of the stem support and into the stem (and into the piston top end if desired) in place of or in addition to frangible members located as previously described.

Figure 9:
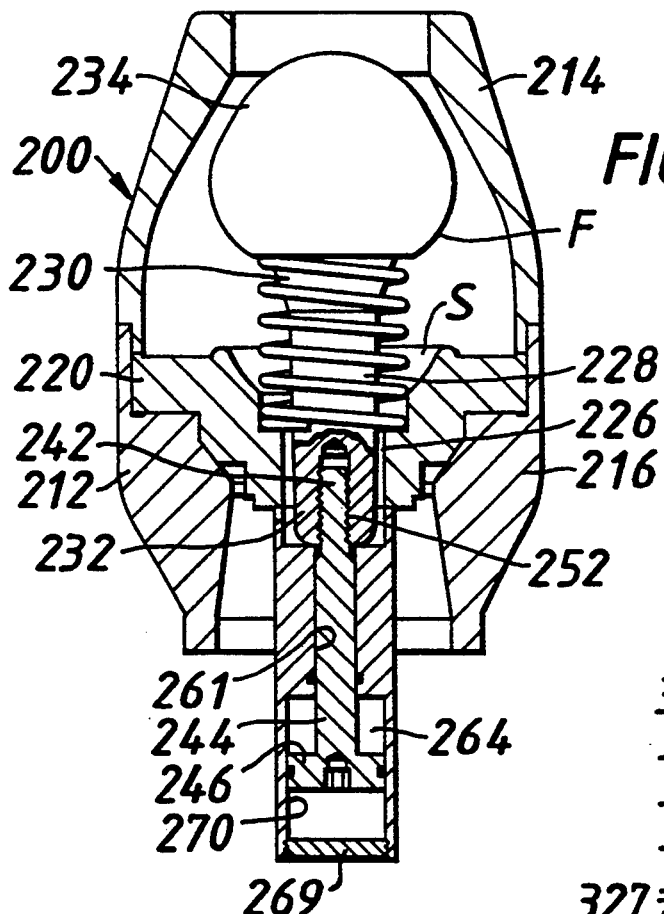
FIG. 9 is a side cross-sectional view of a valve according to the present invention.

FIG. 9 shows another embodiment of a valve according to the present invention which employs a rupture disc or frangible diaphragm 269 rather than frangible holding devices such as are used in the valves shown in FIGS. 1 and 4. A valve 200 has a valve body 212 which includes an upper body 214 and a lower body 216 with a plunger stem support 220 thereacross (like the stem support 20 previously described). A plunger 230 has a stem 228 with a lower end 232 movably mounted in a central channel 226 of the stem support 220. The plunger 230 has a nose 234 for sealingly contacting the interior of the body 212. A piston 240 has a top end 242, and a bottom end 244, and an end plate 246. The top end 242 is received in a piston recess 252 of the stem 228. The piston 240 is movably disposed in a central channel 261 of a piston housing 260. The housing 260 has a compressible fluid chamber 264 (like the chamber 64 previously described). A frangible disc or diaphragm 269 is removably (e.g. threadedly) or permanently (e.g. held by epoxy adhesive) disposed in an end channel 270 of the housing 260. The piston 240 does not move until the force of the hydrostatic head in the wellbore breaks the diaphragm 269, at which point the head acts on the piston as previously described. As in the valve 10 (FIG. 1) fluid flow through a top end of the valve body against the nose moves a lower nose surface F against a surface S on the stem support.

Figure 10:
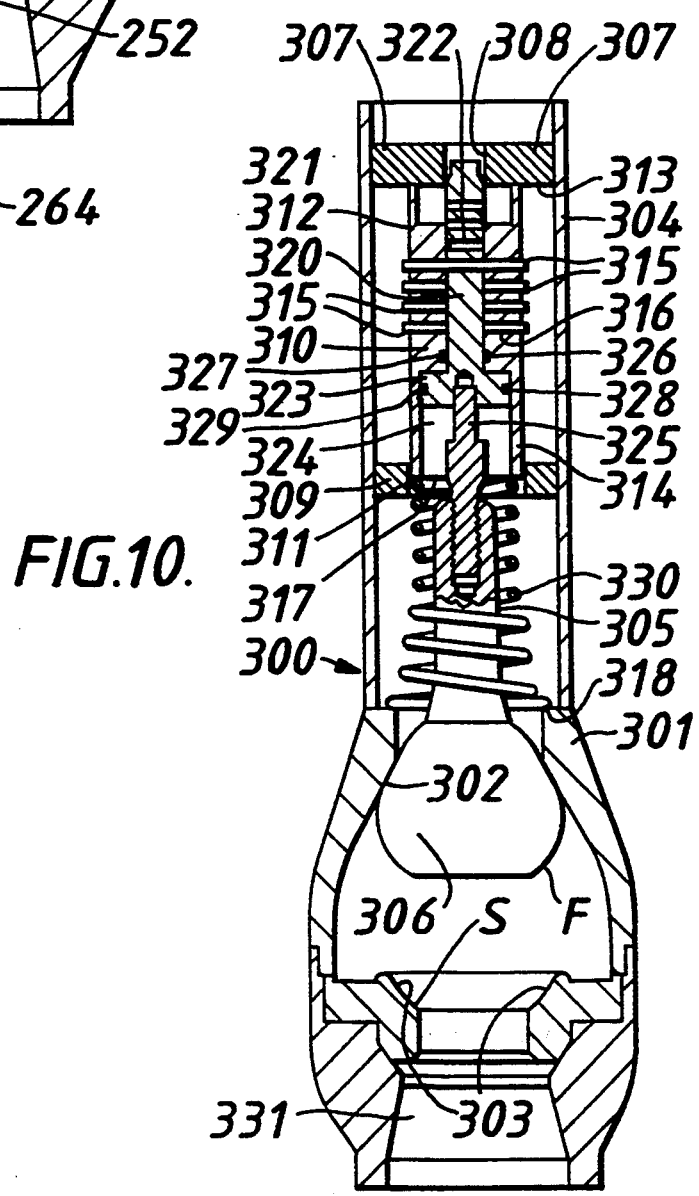
FIG. 10 is a side cross-sectional view of a valve according to the present invention.

FIG. 10 illustrates a valve 300 according to the present invention which has a valve body 301, with an inner sealing surface 302, a lower valve seat 303, an upper tubular body 304, a valve stem 305 to which is attached a plunger nose 306 for sealingly contacting the inner sealing surface 302, a top piston guide 307 extending across the upper tubular body 304 with a hole 308 therein, and a lower housing guide 309 with a hole 311 therein. A piston housing 310 is disposed in the upper tubular body 304 and has a top end 312 which may abut a lower surface 313 of the top piston guide 307 and a bottom end 314 which is movable through the hole 311 of the lower housing guide 309. As in the valves 10 and 200, fluid flow through a top of the valve moves a lower nose surface F against a surface S on the stem support.

A piston 320 has a portion movably disposed in the housing 310 and a portion which extends therefrom. A top portion 321 of the piston 320 is initially held immobile in the housing 310 by one or more frangible holding device members 315 which extend through holes 316 in the housing 310 into holes 322 in the piston 320. A bottom plate 323 of the piston 320 is movably disposed in a fluid chamber 324 formed in the bottom 314 of the piston housing 310. A bottom piston portion 325 is secured to the bottom plate 323 and in and to an end 317 of the stem 305. An O-ring 326 in a recess 327 in the housing 340 seals the piston-housing interface. An O-ring 328 in a recess 329 in the bottom plate 323 seals the plate-fluid-chamber-wall interface. A spring 330 abuts an edge 317 of the housing 310 and a shoulder 318 of the valve body 301. Fluid may flow through the hole 308 through, down, and around the various structures, and out the channel 331 when the valve is open.

Force of a hydrostatic head of fluid in the wellbore acts through a channel 331 of the valve body 301 and through the hole 311 on the bottom plate 323 of the piston 320 to move the plate 323 to compress compressible fluid in the fluid chamber 324 and break the frangible members 315, at which point the spring 330 forces the housing 310 away from the plunger 306 and freeing the plunger 306 to move upwardly to seal the valve closed. Downward fluid flow is again possible, if desired, by flowing fluid down at sufficient volume and pressure to move the housing-piston-plunger combination downwardly, unseating the plunger and opening the valve.

Figure 11:
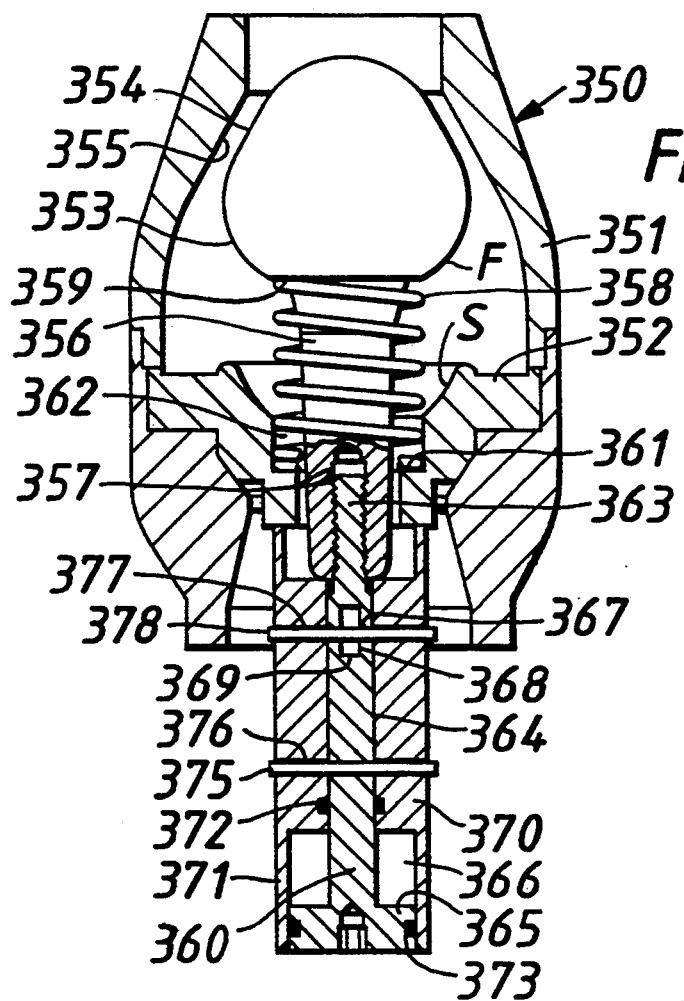
FIG. 11 is a side cross-sectional view of a valve according to the present invention.

FIG. 11 illustrates a valve 350 similar to the valve of FIG. 1, but with a piston slot for one holding device (shear pin) and with frangible holding devices (shear pins) arranged so that partial valve closure is effected when a first shear pin (e.g. a 100 p.s.i. pin) is initially sheared and then a second shear pin (e.g. a 500 p.s.i. pin) is subsequently sheared effecting total closure of the valve. It is within the scope of this invention to employ more than two holding devices and more than one slot to effect more and more valve closure prior to total closure if desired more than one holding device can extend through a single slot, rather than using multiple slots (or in addition thereto).

The valve 350 has a valve body 351; a stem support 352 thereacross, optionally with flow paths therethrough as in FIG. 3; a plunger 353 movably disposed therein with a sealing nose 354 for sealingly contacting an inner sealing surface 355 of the valve body 351; a stem 356 to which the nose is secured or formed integrally of; and a stem recess 357. A spring 358 is biased against a bottom edge 359 of the nose 354 and against a shoulder 361 of the stem support 352. The stem 356 is movable in and with respect to a hole 362 in the stem support 352. An end 363 of a piston 360 is received in and held in the stem recess 357. The piston 360 extends through a channel 364 in a piston housing 370. A bottom plate 365 of the piston 360 is movably disposed in a fluid chamber 366 in an end 371 of the housing 370. An O-ring 372 seals the piston-housing interface and an O-ring 373 seals the plate-fluid chamber interface.

Initially the spring 358 is prevented from moving the plunger by a frangible first shear pin 375 which extends through a hole 376 in the housing 370 and a hole 366 in the piston 360. A second frangible shear pin 378 extends through a hole 377 in the housing 370 and a hole 367 in the piston 360 and through a slot 368 in the piston 360. Upon breaking of the first shear pin 375 the piston 360 moves until the second shear pin 378 abuts an end 369 of the slot 368. This movement partially closes off the flow path through the top of the valve since the nose 354 moves closer to the inner sealing surface 355. Upon subsequent breaking of the second shear pin 378 (when the force of a hydrostatic head of fluid outside the valve acting on the bottom plate of the piston is increased), the piston 360 and plunger 353 freed so the nose 355 is movable to seal the valve shut. At this point the spring 358 pushes the nose 355 upwardly against the valve body's interior. As in the valve 10 (FIG. 1) fluid flow through a top end of the valve of sufficient force to overcome the spring force moves the plunger with a lower nose surface F toward an/or against a surface S on the stem support, permitting the fluid moving against the sealing head to flow out of the bottom of the valve. Multiple shear pins or other frangible holding devices may be used to effect a desired amount of restriction of fluid flow through the top of the valve and desired timed sequences of partial restriction and then closure. One or more frangible holding devices may be used through the housing, piston, and slot for various sequences of stepped valve flow restriction and closing.

Figure 12:
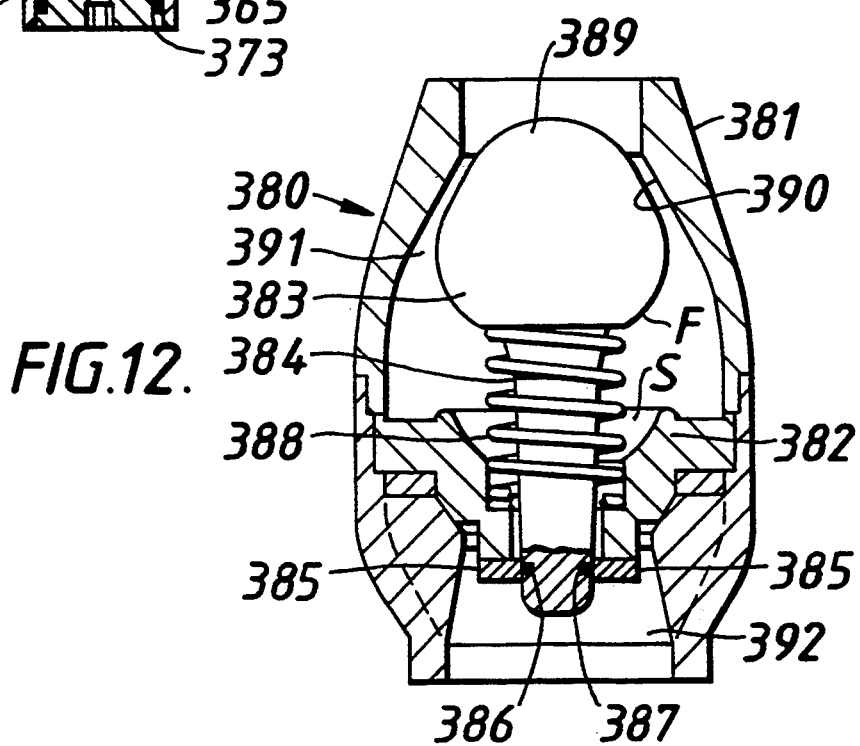
FIG. 12 is a side cross-sectional view of a valve according to the present invention.

FIG. 12 illustrates a valve 380 according to the present invention which has a valve body 381 with a stem support 382 therein and thereacross. A plunger 383 has a stem 384 movably mounted in the stem support 382. One or more (two shown) frangible holding devices 385 have projections 386 which are secured in recesses 387 in the stem 384. Upon breaking or degradation of the holding devices 385 by chemical action or heat, a spring 388 forces a nose 389 of the plunger 383 into sealing contact with an inner sealing surface 390 of the valve body 381, closing off the valve to fluid flow therethrough. In one embodiment the stem support has fluid flow paths therethrough so fluid may flow either way through the valve prior to release of the spring (through a valve body fluid channel 391; through flow paths through the stem support, similar to those of the device in FIG. 3; and through a bottom valve body fluid flow channel 392, or vice versa). As in the valve 10 (FIG. 1) fluid flow through a top end of the valve moves a lower nose surface F toward or against a surface S on the stem support permitting fluid flow from top to bottom of the valve.

Figure 13:
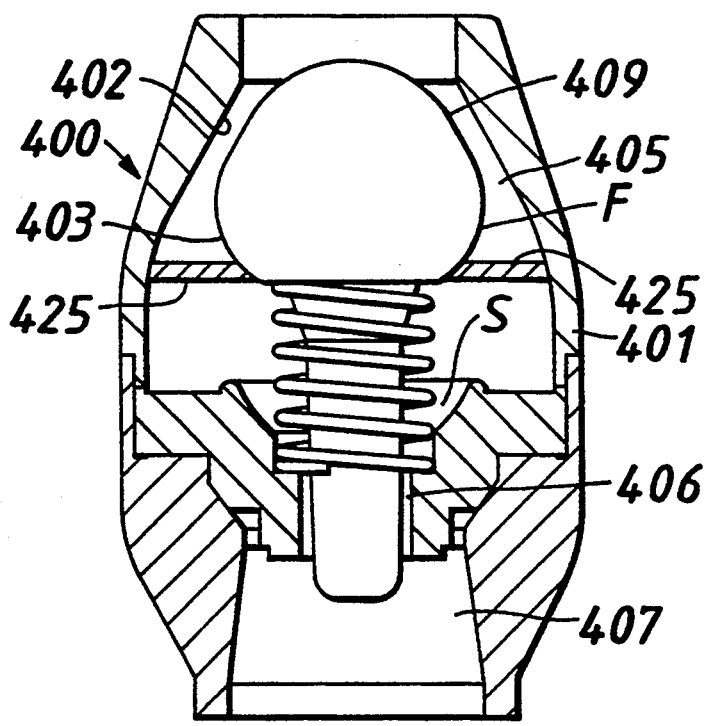
FIG. 13 is a side cross-sectional view of a valve according to the present invention.

FIG. 13 shows a valve 400 according to the present invention like the valve 380 without the frangible holding devices 385, but with frangible holding vanes, bars or ribs 425 which are secured to a plunger nose 409 of a plunger 403. Otherwise the valve 400 is like the valve 380 and the valve 400 has these parts: valve body 401; body sealing surface 402; stem support 404; top fluid flow channel 405; stem support flow channel 406 (optionally with stem support flow pathways as in FIG. 3); and bottom fluid flow channel 407. As in the valve 10 (FIG. 1) fluid flow through a top end of the valve against the nose of the plunger with sufficient force moves the nose away from the top inner sealing surface of the body's interior so that a lower nose surface F is moved toward and then to contact a surface S on the stem support, permitting fluid flow from the top to and through the bottom of the valve.

Figure 14:
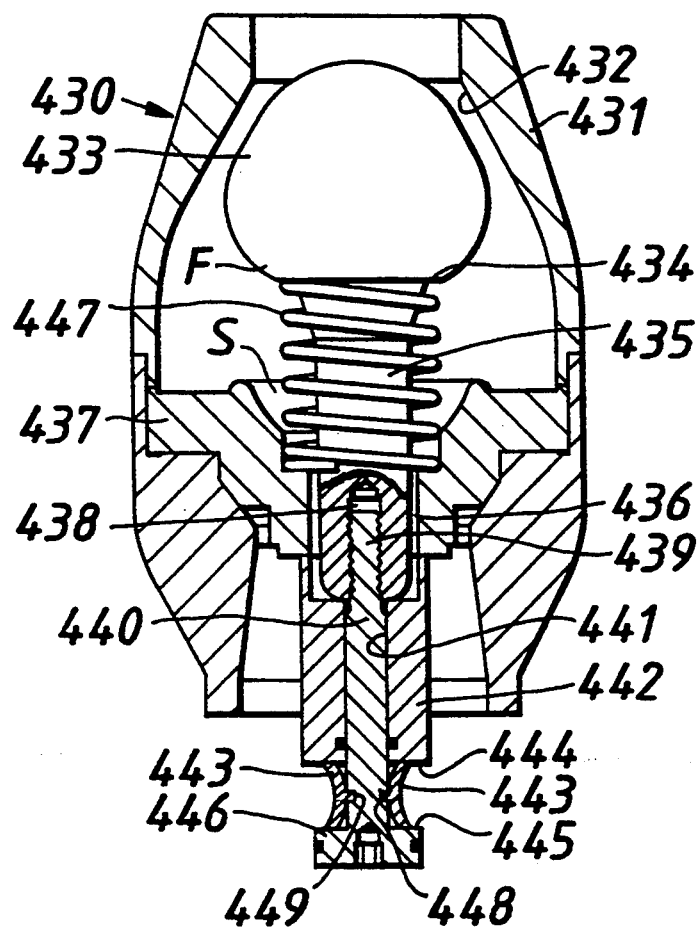
FIG. 14 is a side cross-sectional view of a valve according to the present invention.

FIG. 14 shows a valve 430 according to the present invention with a valve body 431; and an inner sealing surface 432 for sealing contact by a nose 433 of a plunger 434. A stem 435 extends from the nose 433 and is movably disposed in a central hole 436 of a stem support 437 (which may have flow paths therethrough as in FIG. 3) which extends across the interior of the valve body 431. A stem recess 438 receives and holds an end 439 of a piston 440 which is movably disposed in a piston channel 441 of a piston housing 442. Frangible holding devices 443 abut an end 444 of the housing 442 and a top 445 of a piston bottom plate 446. The holding devices 443 prevent the piston and therefore the plunger from moving in response to the force of a spring 447 (biased against the plunger and the stem support) and/or in response to fluid flow up through the valve 400 (until the holding devices are degraded or broken). Optionally the holding devices 443 may have a protrusion 448 received and held in recesses 449 in the piston 440 (or the piston may have a protrusion into a recess in the holding device). Fluid flow through the valve is similar to flow through the valve 400. As in the valves 10 and 200 fluid flow through a top end of the valve body and downwardly moves a lower nose surface F toward or against a surface S on the stem support.

FIG. 15 shows a valve 450 according to the present invention which has a valve body 451 with a top flow channel 452, a bottom flow channel 453, and a stem support 454 thereacross (optionally with flow channels as flow paths as in the valve of FIG. 3). A nose 455 of a plunger 456 is movable to sealingly contact an inner sealing surface 457 of the valve body 451. A stem 458 of the plunger 456 is movably disposed in a central channel 459 of the stem support 454. A stem recess 461 receives and holds a top 462 of a piston 460 which is movably mounted in a piston housing 463. The housing 463 has a fluid chamber 464 with fluid therein compressible by the action of a bottom plate 465 of the piston 460. A spring 466, biased against a bottom edge 467 of the nose 455 and a shoulder 468 of the stem support 454, is prevented from pushing the plunger up to close the valve by two "memory metal" bands 469 which, upon exposure to heat at a known temperature (either heat encountered in the wellbore or heat introduced therein via hot fluids or chemical reaction), contact so that fingers 470 of the bands initially projecting into recesses 471 in the piston 460 are retracted, freeing the piston for movement effected by the force of the hydrostatic head of fluid in the wellbore on the plate 465. The bands 469, alternatively, could be made from any material as previously described herein for frangible holding devices and could be breakable by force or degradable by chemical reaction. O-rings seal the piston-housing and plate-fluid-chamber interfaces as for valves previously described. As in the valve 10 (FIG. 1) fluid flowing through a top end of the valve body moves a lower nose surface F toward or against a surface S on the stem support.

FIG. 16 discloses a valve 480 according to the present invention similar to the valve 10 (FIG. 1) with a body, stem, plunger with nose, and stem support like that of the valve 10. A piston housing 481 has a piston 482 movably disposed therein, with the piston secured to the stem. One or more frangible containers or capsules 483 are disposed in a chamber 484 for breaking by a plate 485 of the piston 482 in response to the force of a hydrostatic head of fluid in the wellbore on the plate 485. The capsules 483 contain either: a chemical substance which will degrade, weaken, and break a frangible holding device 486 extending through the housing and piston; or two substances which, upon contact with each other in the chamber 484 react to produce either heat to break the holding device 486 (one or more may be used) or a resulting chemical substance which attacks and degrades the holding device 486. The chemicals and/or pieces of the holding device 486 can flow into a chamber or chambers 487 in the housing 481. Initially the chemical(s) flow from the chamber 484 through a flow channel 488 to attack the holding device 486. Plugs 489 plug and seal a hole in which the device 486 is disposed. As in the valves 10 and 200, fluid flow through a top end of the valve with sufficient force to overcome a spring biasing apart the plunger and the stem support moves a lower nose surface F toward or against a surface S on the stem support permitting fluid to flow from the top to and through the bottom of the valve.

Figure 17:
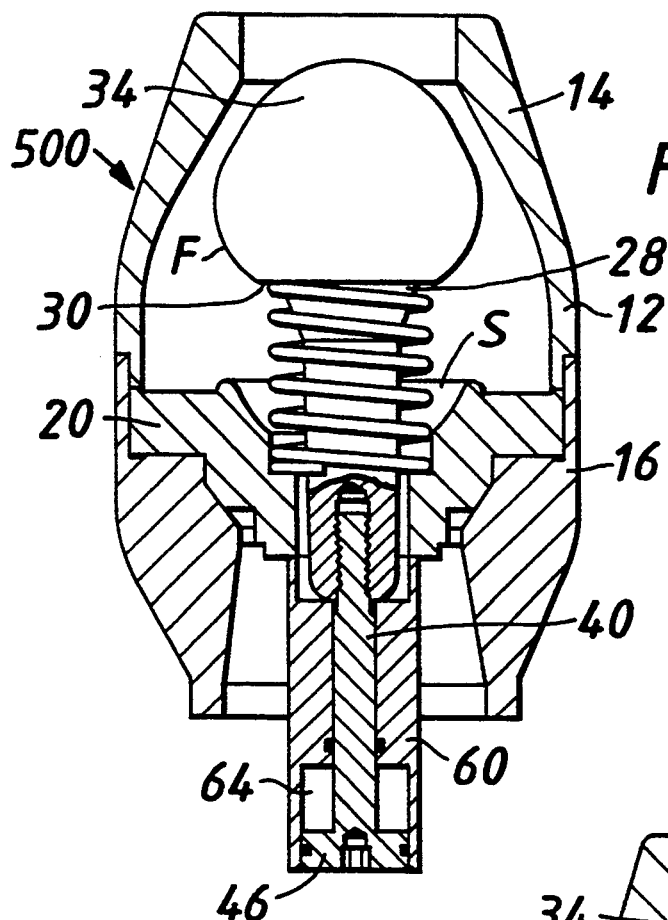
FIG. 17 is a side cross-sectional view of a valve according to the present invention.

FIG. 17 illustrates a valve 500 like the valve 10 (with identical numerals indicating the same parts), but with no frangible holding devices, shear pins, memory metal bands, etc. The force of the spring 70 is insufficient to move the piston to compress compressible fluid F in the chamber 64; but in the wellbore the force of a hydrostatic head of fluid on the bottom plate 46 does result in compression of the fluid F and movement of the piston 40 and plunger 30 to restrict flow through or close the valve. As in the valves 10 and 200, fluid flow through a top end of the valve with sufficient force to overcome the spring moves a lower nose surface F toward or against a surface S on the stem support.

Figure 18:
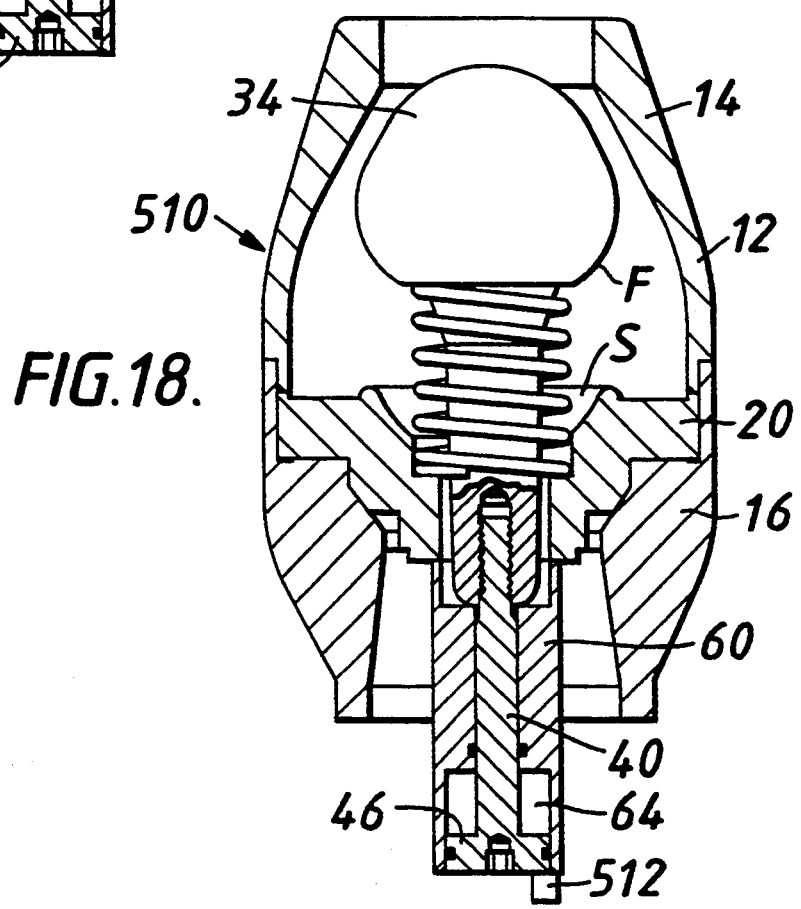
FIG. 18 is a side cross-sectional view of a valve according to the present invention.

FIG. 18 illustrates partially schematically a valve 510 like the valve 500 (FIG. 17); but with the addition of a timer trip mechanism 512 (shown schematically) interconnected between the piston 40 and the housing 60 which holds the piston 40 until a selected period of time has elapsed at which point the piston is released. As with the possibility of placing holding devices according to this invention in a plurality of effective locations in valves according to this invention, a timer may be placed anywhere (releasably contacting or abutting the plunger, nose, stem or piston) so as to hold the piston, stem, nose or plunger immobile until a desired time period has elapsed. As in valves previously described, fluid flow through a top end of the valve with sufficient force moves the plunger and a lower nose surface F of it toward, and if the force is large enough against, a surface S on the stem support.

It is within the scope of this invention and the embodiments described herein to provide for sufficient piston-plunger movement to only restrict fluid flow through a valve without completely closing it off; e.g. by providing a piston of such length or a sealing nose of such dimensions that after the full extent of piston or nose travel the valve is not fully closed. Valves as described herein and their components are useful with valves used in wellbore operations and with the valves, float valves, and equipment described in the references submitted herewith. Although various piston holding members have been described, it is within the scope of this invention to releasably hold the piston, stem, plunger or nose using a frangible holding device with interconnection between any of these members and the valve body, stem support or piston housing for releasably preventing movement thereof and then effecting valve flow restriction and/or closing. When heat sensitive holding members are used, the rest of the valve is made of material which withstands the thermal attack on the holding members.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A valve for controlling flow of a fluid in a conduit in which the valve is emplaced, the valve comprising
a body with a first end and a second end and a hollow central fluid flow channel therethrough, and an inner body sealing surface at the first end thereof,
a plunger with a stem movably disposed in the body for movement with respect thereto, the stem having a first end and a second end,
a sealing head on a first end of the stem of the plunger for restricting fluid flow through a top of the body's hollow central fluid flow channel and for sealingly contacting the inner body sealing surface to prevent fluid flow through the valve,
a piston with a first piston end and a second piston end, the first piston end secured to the stem,
a piston housing in which the piston is movably mounted, a portion of the second piston end movably mounted in the piston housing,
the piston housing having a first housing end and a second housing end, the first piston end projecting from the first housing end,
at least one holding member releasably preventing piston movement until it is broken or degraded,
the second housing end having a sealed fluid chamber therein,
the second piston end having a piston plate across and sealingly closing off the fluid chamber,
the fluid chamber having a fluid therein compressible by forced movement of the piston plate, and the piston plate having an exterior exposed to a hydrostatic head of fluid exterior to the valve such that the hydrostatic head of fluid, upon reaching sufficient force, moves the piston plate to compress the fluid, thereby moving the sealing head to restrict flow through the valve.

2. The valve of claim 1 wherein the at least one holding member releasably contacts the piston and extends through a hole in the piston housing and through a hole in the piston.

3. The valve of claim 1 wherein the at least one holding member is a plurality of frangible holding devices, each frangible holding device extending through a hole in the piston housing and a corresponding hole in the piston.

4. The valve of claim 1 wherein the at least one holding member is subject to chemical degradation.

5. The valve of claim 1 wherein the at least one holding member is subject to thermal degradation.

6. The valve of claim 1 further comprising
plunger bias apparatus releasably urging the plunger's sealing head into sealing contact with the inner body sealing surface of the body.

7. The valve of claim 6 wherein the plunger bias apparatus is a spring with a spring force, the spring abutting the sealing head at one end and the stem support at another end and wherein fluid introduced against the sealing head after the sealing head sealingly contacts the inner body sealing surface with sufficient force to overcome the spring force unseats the sealing head from the inner body sealing surface so the fluid flows through the valve.

8. The valve of claim 1 further comprising
a stem support mounted across the hollow central fluid flow channel, the stem support having at least one fluid flow channel therethrough, and
the piston housing mounted below the stem support.

9. The valve of claim 8 further comprising
the body having a lower body surface at the second end thereof,
the sealing head movable in response to fluid introduced through the first end of the body to move away from the inner body sealing surface toward or to contact the lower body surface to permit fluid flow out from the second end of the body.

10. The valve of claim 8 wherein the lower body surface is formed of the stem support.

* * * * *